Figure 28:
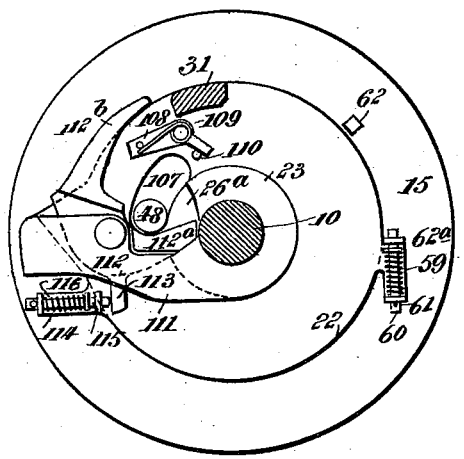

No. 618,689. Patented Jan. 31, 1899.
T. J. KOVEN.
CLUTCH.
(Application filed Jan. 28, 1898.)
(No Model.) 7 Sheets—Sheet 1.
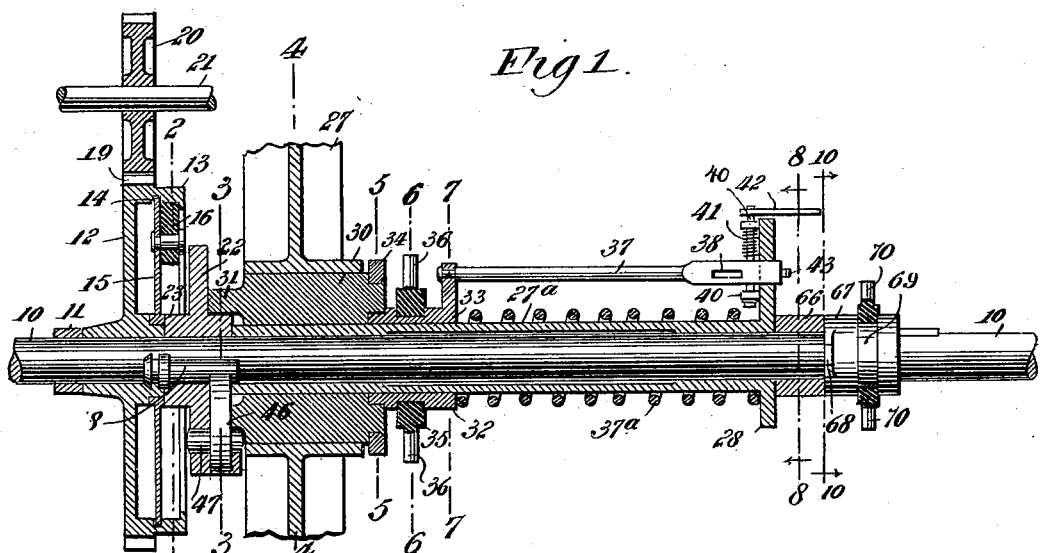
Fig 1.
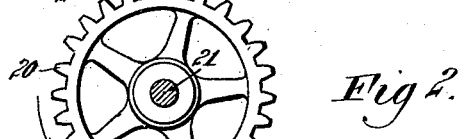
Fig 2.
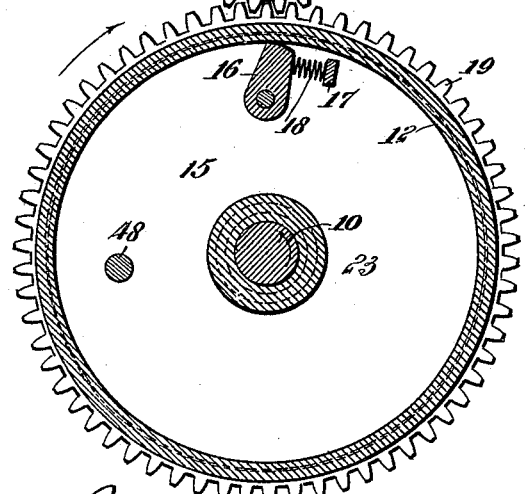
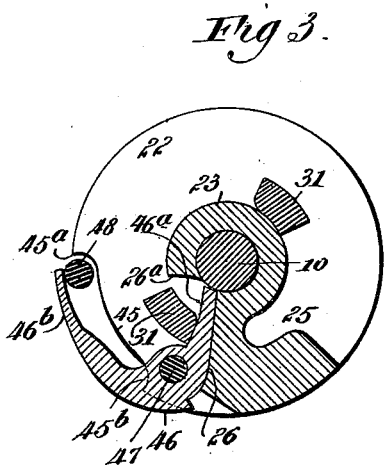
Fig 3.
WITNESSES:
INVENTOR
T. J. Koven.
BY
ATTORNEYS.

No. 618,689.　　　　　　　　　　　　　　　Patented Jan. 31, 1899.
T. J. KOVEN.
CLUTCH.
(Application filed Jan. 28, 1898.)
(No Model.)　　　　　　　　　　　　　　　　　7 Sheets—Sheet 2.
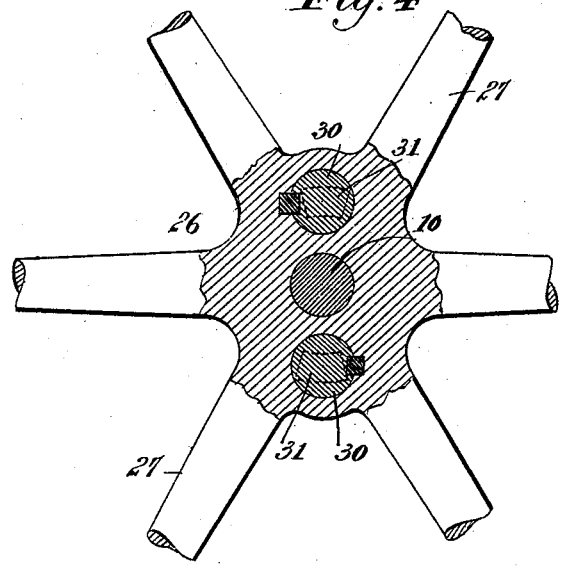
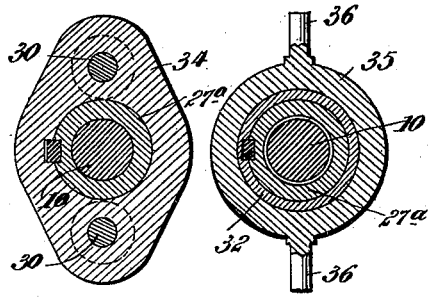
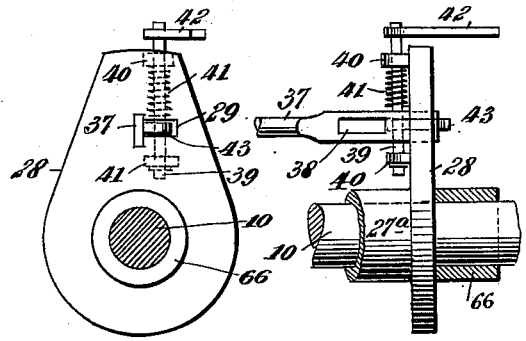
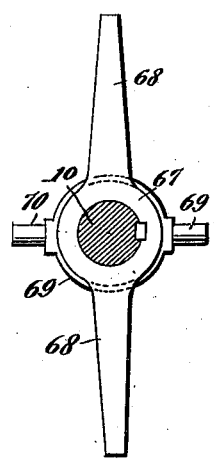
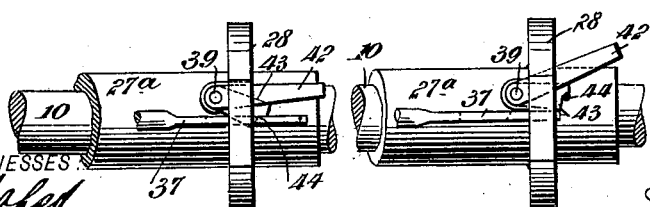
WITNESSES　　　　　　　　　　　　　　　　INVENTOR
　　　　　　　　　　　　　　　　　　　　　T. J. Koven
　　　　　　　　　　　　　　　　　　　BY
　　　　　　　　　　　　　　　　　　　　　ATTORNEYS.

No. 618,689. Patented Jan. 31, 1899.
T. J. KOVEN.
CLUTCH.
(Application filed Jan. 28, 1898.)
(No Model.) 7 Sheets—Sheet 3.
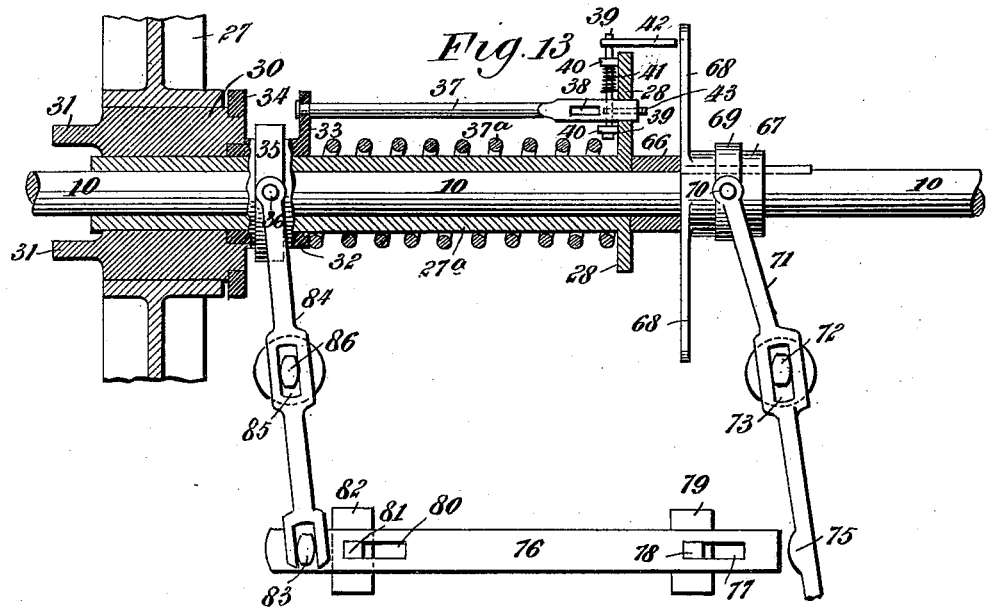
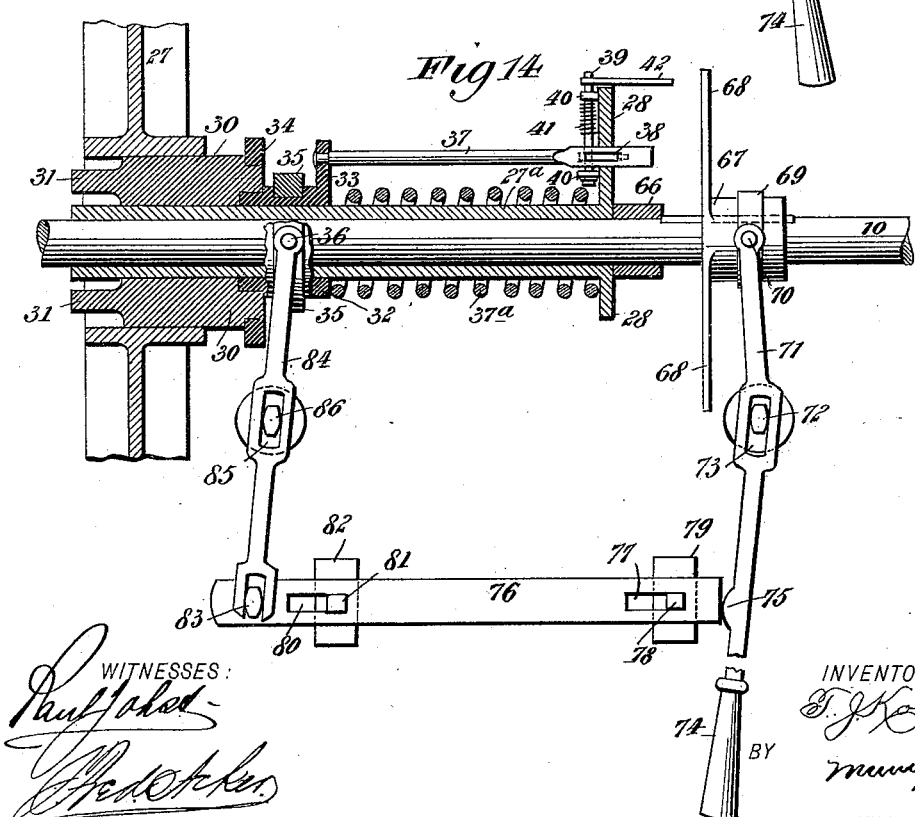
WITNESSES
INVENTOR
T. J. Koven.
BY
ATTORNEYS.

No. 618,689. Patented Jan. 31, 1899.
T. J. KOVEN.
CLUTCH.
(Application filed Jan. 28, 1898.)
(No Model.) 7 Sheets—Sheet 4.
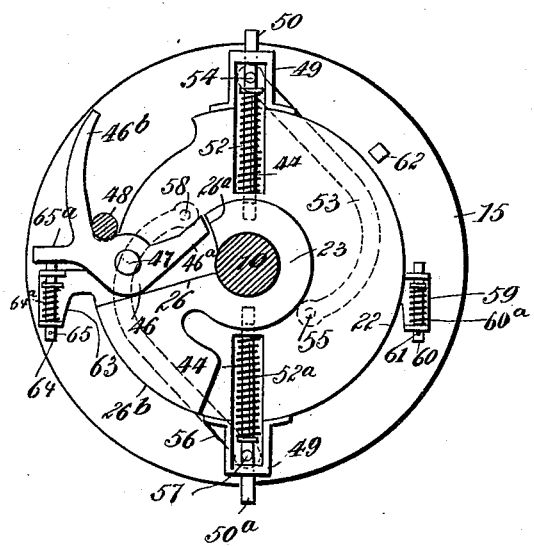
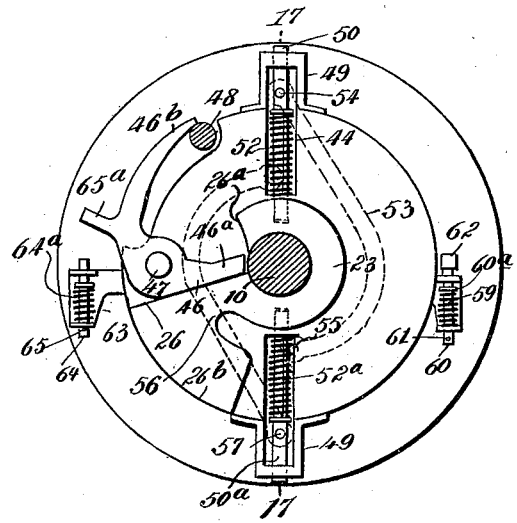
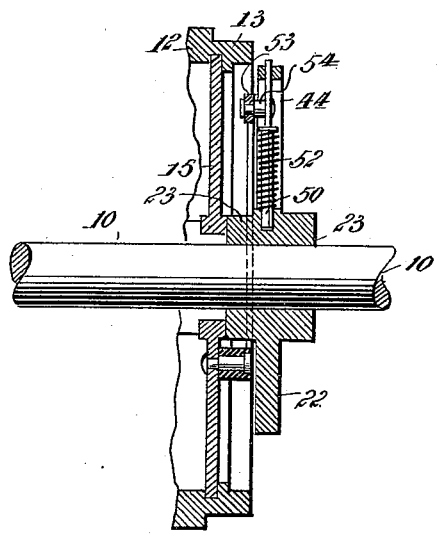
WITNESSES:
INVENTOR
T. J. Koven.
BY
ATTORNEYS.

No. 618,689. Patented Jan. 31, 1899.
T. J. KOVEN.
CLUTCH.
(Application filed Jan. 28, 1898.)
(No Model.) 7 Sheets—Sheet 5.
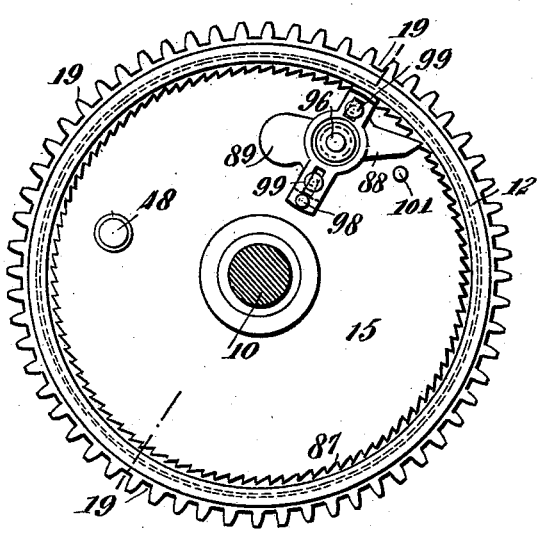
Fig. 18.
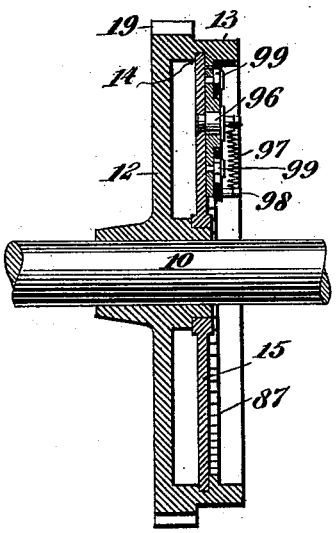
Fig. 19.
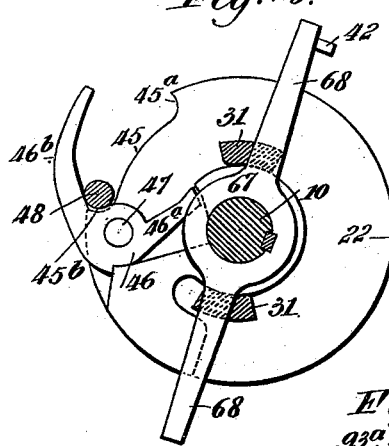
Fig. 20.
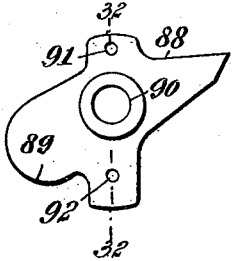
Fig 31.
Fig 32.
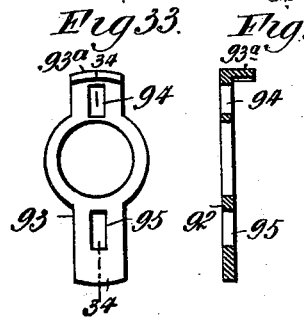
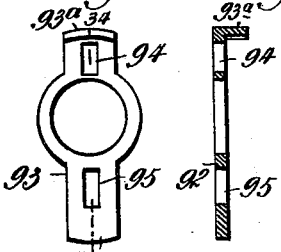
Fig 33. Fig. 34.
WITNESSES:
INVENTOR
T. J. Koven
BY
ATTORNEYS.

No. 618,689.　　　　　　　　　　　　　　Patented Jan. 31, 1899.
T. J. KOVEN.
CLUTCH.
(Application filed Jan. 28, 1898.)
(No Model.)　　　　　　　　　　　　　　7 Sheets—Sheet 6.
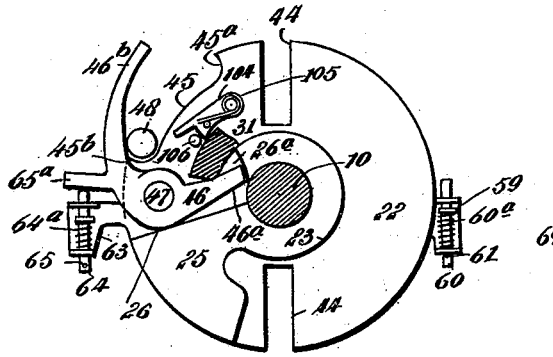
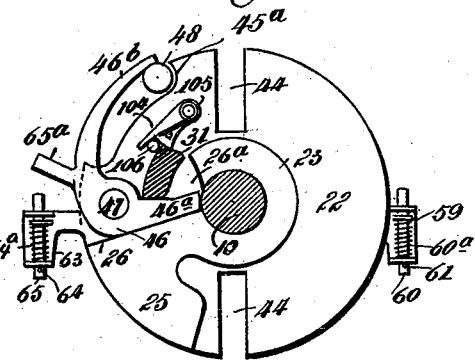
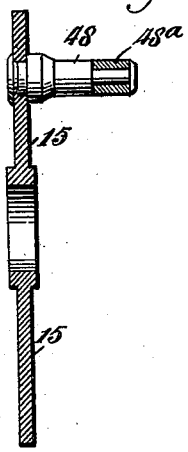
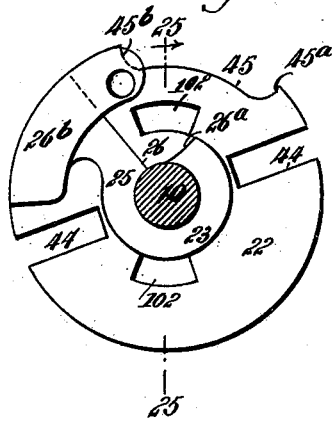
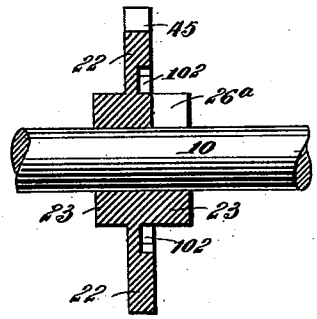
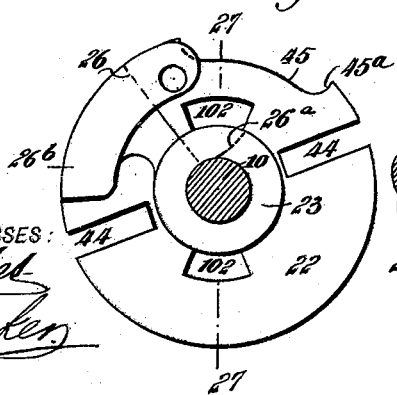
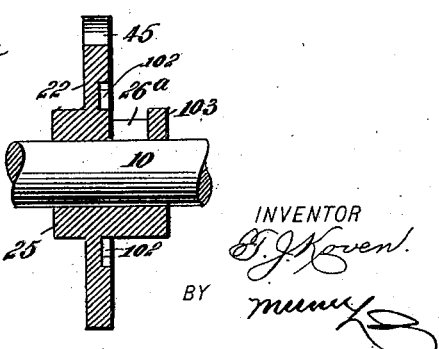
WITNESSES:　　　　　　　　　　　　　　INVENTOR
　　　　　　　　　　　　　　　　　　　　　T. J. Koven.
　　　　　　　　　　　　　　　　　　　BY
　　　　　　　　　　　　　　　　　　　　　ATTORNEYS.

No. 618,689. Patented Jan. 31, 1899.
T. J. KOVEN.
CLUTCH.
(Application filed Jan. 28, 1898.)
(No Model.) 7 Sheets—Sheet 7.

WITNESSES:

INVENTOR
T. J. Koven
BY
ATTORNEYS

UNITED STATES PATENT OFFICE.

THEODORE J. KOVEN, OF JERSEY CITY, NEW JERSEY.

CLUTCH.

SPECIFICATION forming part of Letters Patent No. 618,689, dated January 31, 1899.

Application filed January 28, 1898. Serial No. 668,313. (No model.)

*To all whom it may concern:*

Be it known that I, THEODORE J. KOVEN, of Jersey City, in the county of Hudson and State of New Jersey, have invented a new and Improved Clutch, of which the following is a full, clear, and exact description.

The invention relates to an improvement in clutches for machinery, and especially to an improvement upon the construction shown in the patent granted to me January 12, 1897, No. 575,249.

The object of the invention is to store power, when the machine is stopping, in such manner as to make such power available when the machine is to be again started, and further to provide a construction to such end that will be simple, durable, and economical and capable of application to a wide range of machines.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 29:
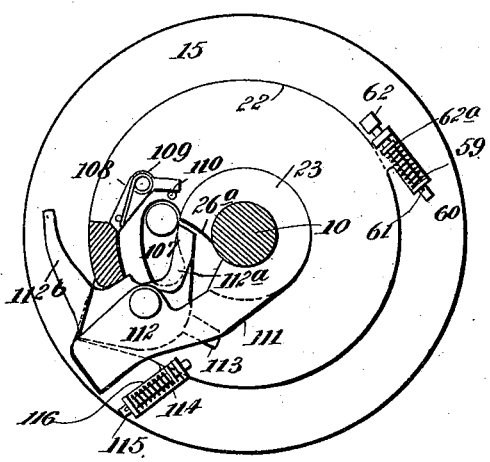
Figure 30:
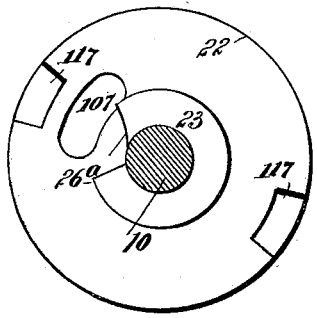
Figures 35, 36, 37:
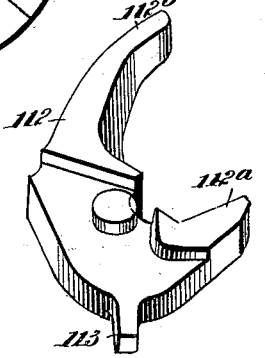

Figure 1 is a vertical section of the device. Fig. 2 is a transverse section on the line 2 2 of Fig. 1. Fig. 3 is a transverse section on the line 3 3 of Fig. 1. Fig. 4 is a vertical section on the line 4 4 of Fig. 1. Fig. 5 is a vertical section on the line 5 5 of Fig. 1. Fig. 6 is a vertical section on the line 6 6 of Fig. 1. Fig. 7 is a vertical section on the line 7 7 of Fig. 1. Fig. 8 is a vertical section on the line 8 8 of Fig. 1. Fig. 9 is a side elevation of the locking device for the clutch, a part being in section. Fig. 10 is a vertical section on the line 10 10 of Fig. 1. Fig. 11 is a plan view of the locking mechanism of the clutch, illustrating the mechanism in locking position. Fig. 12 is a view similar to Fig. 11, illustrating the position of the parts of the locking device when the clutch is applied. Fig. 13 is a vertical sectional view of the device, illustrating the shifting mechanism applied, the parts being in operative position. Fig. 14 is a view similar to Fig. 13, in which the shifting mechanism and attached parts are in the position they occupy when the clutch is not in operation. Fig. 15 is a right-hand face view of the shaft-disk, illustrating its position relative to the clutch-disk when the machine to which the clutch is applied is at rest. Fig. 16 is a view similar to Fig. 15, showing the position of the parts when the main shaft is in driving connection with the clutch. Fig. 17 is a vertical section on the line 17 17 of Fig. 16. Fig. 18 is a sectional view, illustrating a slight modification in the construction of the clutch-disk and the master-wheel. Fig. 19 is a transverse section through the mechanism shown in Fig. 18, taken practically on the line 19 19 of Fig. 18 and showing additions to said construction. Fig. 20 is a side view of the driving-shaft disk and a sectional view through the shaft, showing the position of the trip-arm when engaged with the releasing mechanism of the clutch. Fig. 21 is a face view of the shaft-disk, the driving-shaft being in section, the view illustrating also the application of a latch to the driving-segment of the drive-pulley, the disk being in its initial position. Fig. 22 is a view similar to Fig. 21, the shaft-disk being in driving position. Fig. 23 is a section through the clutch-disk. Fig. 24 is a side view of the driving-shaft disk, illustrating slight modifications in the manner of locking the driving-pulley segments. Fig. 25 is a section on the line 25 25 of Fig. 24. Fig. 26 is a face view of the shaft-disk, illustrating another modification in its construction. Fig. 27 is a section on the line 27 27 of Fig. 26. Fig. 28 is a face view of the clutch-disk and the shaft-disk, illustrating a slight modification in their construction, the modification consisting in the arrangement of the parts to receive the segmental projections from the driving-pulley when said segmental projections are removed from the hub of the shaft-disk, the said Fig. 28 showing the parts in their initial position. Fig. 29 is a view similar to Fig. 28, showing the parts illustrated in Fig. 28 in the position they assume when the clutch is in operation. Fig. 30 is a face view of the shaft-disk when the construction shown in Figs. 28 and 29 is employed, the shaft being in section. Fig. 31 is a detail view of the dog shown in Fig. 18. Fig. 32 is a section through the said dog, taken on the line 32 32 of Fig. 31. Fig. 33 is a detail view of the spring-controlled plate used in connection with the dog shown in Fig. 31. Fig. 34 is a vertical section taken practically on the line 34 34 of Fig. 33. Fig. 35 is a face view of the lever used in the construction shown in Figs. 28 and 29. Fig. 36 is a section on the line 36 36 of Fig. 35, and Fig. 37 is a perspective view of the lever shown in Figs. 35 and 36.

The drive-shaft 10 of the machine is provided at one end with a fast collar 11 and a master-wheel 12, loosely mounted on the said shaft 10, the said master-wheel being provided with a flange 13 at one side, and in the central portion of the flange a groove 14 is usually made, in which a disk 15 is mounted to revolve, the disk 15 being practically a clutch-disk, and the said disk is loosely mounted ordinarily upon the hub of the master-wheel 12. The disk 15 is provided with one or more pawls 16, pivoted thereto and normally held in engagement with the inner surface of the flange 13 of the master-wheel by a spring 18, as shown in Fig. 2, the said spring being secured to a post 17, projected from the said clutch-disk. The master-wheel is provided with outside teeth 19, which are in mesh with a pinion 20, secured upon a shaft 21, which shaft is continuously rotated from any suitable source of power. A smaller disk 22 is secured upon the shaft 10, the disk being provided with a hub 23, extending from both of its faces. On the right-hand face of the disk 22 a projection 25 is formed, extending from its hub to its periphery, and one side of the projection 25 is practically straight, as shown at 26, the straight surface extending to the shaft 10, and adjacent to the straight surface 26 of the projection of the shaft-disk 22 a recess 26ª of an angular character is made in the right-hand side of the hub 23 of the said disk, as is shown in Figs. 3, 15, 16, and 23, the recess 26ª extending to the aforesaid straight surface 26.

A driving-pulley 27 is loosely mounted on the shaft 10 at the right-hand side of the shaft-disk 22. The pulley 27 is provided with a sleeve 27ª, which extends along the shaft a predetermined distance and terminates at its end in a flange 28, which is preferably given the formation shown in Fig. 8, wherein the said flange is contracted at the top, and above the shaft 10 in the flange 28 an opening 29 is made. One or more, usually two, pins 30 are secured opposite one another in the hub of the driving-pulley 27, as shown in Fig. 4, the pins being arranged one at each side of the shaft 10. These pins may be circular, as shown, and keyed in place to prevent them from turning, or they may be polygonal in cross-section, as desired; but each pin 30 is provided at the end facing the shaft-disk 22 with a segmental extension 31, the said segmental extensions being ordinarily so constructed as to extend over and substantially engage with the hub of the shaft-disk 22 facing the drive-wheel, as shown in Fig. 1.

A shifting collar 32 is mounted on the sleeve 27ª of the driving-pulley 27, the said collar being splined longitudinally upon the pulley-sleeve, so that it may be given lateral movement thereon, but will be compelled to turn with the sleeve. The driving-pulley 27 is constantly rotated from any suitable source of power—as, for example, by belt connection with the shaft 21, operating the pinion 20. The collar 32 is provided at its right-hand end with an upwardly-extending flange 33, as shown in Figs. 1 and 7, and at its left-hand end the collar is provided with a second flange 34, extending beyond opposite sides of the said collar, as shown in Fig. 5, and the pins 30 in the driving-pulley 27 are secured to the flange 34, the said pins being capable of end movement in the said pulley, so that their segmental extensions 31 may be carried from or brought in engagement with the hub portion of the shaft-disk 22.

A ring 35 is loosely mounted on the collar 32, provided with opposite projections 36, adapted to receive a shifting fork. A rod 37, parallel with the shaft 10 and with the sleeve of the driving-pulley, is attached to the right-hand flange 33 of the collar 32. This rod is flattened at its right-hand end and is provided with a longitudinal opening 38, the flattened portion of the rod 37 being held to slide in the opening 29 in the flange 28 at the end of the driving-pulley sleeve.

A shaft 39 is journaled in bearings 40, secured upon the left-hand face of the sleeve-flange 28 at one side of the rod 37, and a spring 41 is secured to the said shaft and to the flange, while at the upper end of the shaft a handle 42 is attached, and between the ends of the shaft a latch-arm 43 is secured, which extends through the opening 29 in the flange 28, as shown in Figs. 8, 9, 11, and 12, the said latch-arm being provided with a recess forming a shoulder 44. When the pins 30 in the driving-pulley are drawn toward the right-hand end of the shaft and away from the shaft-disk 22, the slot 38 in the rod 37 will be carried beyond the right-hand face of the flange 28, secured to the sleeve of the driving-pulley, and the tension of the spring 41 will be such that the latch-arm 43 will be made to enter the opening 38 in the said rod, as shown in Fig. 11, the shoulder 44 of the latch preventing said latch from extending entirely within the said opening 38, and the segmental projections from the driving-pulley will be held out of engagement with the shaft-disk, as illustrated in Fig. 14, and when the handle 42 is carried away from the shaft 10 the latch-arm will be disconnected from the rod 37, and a spring 37ª, which is coiled around the sleeve 27ª of the driving-pulley and has bearing against the collar 32 and the flange 28, will instantly carry the projections from the driving-pulley in direction of the shaft-disk 22.

In diametrically opposite sides of the shaft-disk 22, as shown in Figs. 21, 22, 24, and 26, slots 44 are made, which extend in direction of the hub, and in the periphery of the said shaft-disk 22, near one of the slots, a recess 45 is made, the ends 45ᵃ and 45ᵇ whereof are concave. Adjacent to the straight surface or shoulder 26 at the right-hand side of the disk 22, as shown in the same figures, an angle-lever 46 is pivoted through the medium of a pin 47, the said lever being placed in a pocket formed by the offset 25 on the right-hand face of the said shaft-disk. The inner member 46ᵃ of the lever 46 is adapted to move in the space formed by the recess 26ᵃ, and its movement in one direction is stopped by engagement with the straight surface or shoulder 26 on the said disk, as illustrated in Fig. 22, whereas the other member 46ᵇ is preferably concaved upon its inner face, and the concaved face of this member is opposite the recess 45 in the periphery of the said shaft-disk 22, as is shown in Figs. 21 and 22. A pin 48 is secured to the clutch-disk 15 and extends parallel with the shaft 10 in the path of the member 46ᵇ of the angle-lever 46.

At the outer end of each slot 44 in the shaft-disk 22 a cap 49 is constructed, as shown in Figs. 15 and 16. In each of the slots and the cap therefor a rod is held to slide, guided at its inner end by entering a suitable recess in the hub of the disk, as shown in dotted lines in said Figs. 15 and 16, the rods being designated, respectively, as 50 and 50ᵃ. A spring 52 is coiled around the rod 50 and bears against a shoulder on the rod near its outer end and against the bottom of the recess 44 in which the rod is placed, and a similar spring 52ᵃ, similarly located, is provided for the rod 50ᵃ.

A link-lever 53, provided with a straight and with a curved portion, is attached at the end of its straight portion by means of a pivot-pin 54 to the outer end portion of the rod 50 within the cap 49, the curved end of the said lever being pivoted by a pin 55 to the clutch-disk 15. This lever 53 is at the left-hand face of the shaft-disk and at one side of its hub, and a duplicate lever 56 is located at the same face of the shaft-disk, but at the opposite side of its hub, being pivoted by a pin 58 at its curved end to the clutch-disk 15, diametrically opposite the pivot-pin of the opposing lever on the same disk, and the straight end of the lever 56 is pivotally attached by a pin 57 to the spring-controlled rod 50ᵃ within the capped portion of the slot in which the said rod has movement.

At one side of the shaft-disk 22, adjacent to the lever 53, a bracket extension 59 is formed, in which a pin 60 is held to slide, controlled by a spring 60ᵃ and limited in its movement by a pin 61, one end of the said pin 60 being adapted to receive an offset 62 from the clutch-disk, the pin 60 serving as a cushion for the said offset. At the opposite side of the shaft-disk a second bracket or hanger 63 is located, in which a pin 64 is held to slide, controlled by a spring 64ᵃ and limited in its movement by a pin 65, and a projection 65ᵃ from the angular lever 46 is arranged for engagement with one end of the spring-controlled or cushion pin 64. The cushion-pin 60 is adapted to receive the projection 62 when the shaft 10 is made to revolve through the medium of the clutch, as is shown in Fig. 16, and prevent any jar, and the offset 65ᵃ from the angle-lever engages with the cushion-rod 64 when the shaft 10 stops and the parts are returned to their initial position, preventing any jar in that direction.

A collar 66 separates the end flange 28 of the driving-pulley from the sleeve 67, the said sleeve being mounted to slide upon and turn with the shaft 10. The sleeve 67 is provided with opposing arms 68, as shown in Figs. 10, 13, and 14. A ring 69 is mounted loosely on the sleeve 67, being provided with offsets 70. A fork 71 is pivoted upon the offsets 70, and the said fork is mounted upon a pivot or pivots 72, which enter slots 73 in the lower portion of the fork, the fork terminating at its lower end in the handle 74, and the handle portion of the fork is provided with a projection 75. This projection 75 of the fork 71 is arranged to engage with an end portion of a slide 76. This slide 76 is provided with longitudinal slot 77 near the end facing the handle portion of the fork 71, the slot 77 receiving a projection 78 from a support 79. At the opposite end of the slide a slot 80 is made, receiving a projection 81 from a support 82. At the end of the slide near which the slot 80 is made a spur 83 is formed, which is engaged by the bifurcated end of a fork 84, having a longitudinal slot 85 near its center, receiving a pivot-pin 86, attached to a suitable support, while the upper end of the fork engages the projections 36 from the ring 35, mounted on the sleeve 32, through the medium of which the pins 30 of the pulley 27 are carried to and from the shaft-disk 22.

In the operation of the device, supposing the parts to be in their initial position, the shaft 10 being at rest, the pulley 27 being in motion, and also the master-wheel 12, when the drive-shaft is at rest the shaft-disk will occupy the position shown in Fig. 15 and the pin 48 from the clutch-disk will occupy the position shown in the same figure, being in engagement with the body of the lever 46, adjacent to the base of its member 46ᵇ. In stopping the motion of the driving-shaft the handle 74 of the forked lever 71 is carried toward the left-hand end of the machine, taking the projections 68 upon the sleeve 67 out of the path of the handle 42 of the shaft 39, carried by the flange of the pulley-sleeve, as shown in Fig. 14, the segmental projections 31 of the pins 30 being at that time carried from over the hub of the shaft-disk 22 and out of the path of the angle-lever 46. In carrying the pins 30 of the driving-pulley away from the shaft-disk the rod 37 of the pulley is locked, as hereinbefore stated, by the latch 43, as shown in Fig. 11. When it is desired to bring the clutch into operation, the handle end 74 of the forked lever 71 is carried toward the right, which will bring the uppermost projection 68 of the sleeve 67 in engagement with the handle 42 on the shaft 39, and as the sleeve 67 is carried toward the left-hand end of the shaft 10 the handle 42 is forced into the position shown in Figs. 12 and 13, causing the handle to turn the shaft 39 in a manner to release the latch 43 from the keeper-bar 37, permitting the spring 37ª to act and the extensions 31 of the pulley-pins 30 to enter in the path of the lever 46 on the shaft-disk. When a projection 68 from the sleeve 67 engages with the handle 42, the segmental projections 31 of the pins 30 from the driving-pulley will occupy the position shown in Fig. 20, so that they will be brought in the track of the lever 46 before reaching the said lever, thus insuring the uppermost projection 31 engaging fairly with the inner or substantially horizontal member 46ª of the angle-lever 46, and as this contact with the said member 46ª is made said member 46ª is forced downward to an engagement with the straight surface 26 of the shaft-disk and the upper or curved member 46ᵇ is drawn inward, carrying the pin 48, attached to the clutch-disk 15, upward to the position shown in Fig. 16, reversing the movement and bringing the projection 62 from the clutch-disk against the cushion-pin 60. At this time the pawl 16 of the clutch-disk, which acts as a locking device, will engage with the inner surface of the flange 13 of the master-wheel 12, and the clutch-disk by reason of this engagement will compel the shaft-disk to turn, and consequently the shaft 10, the shaft-disk and shaft turning in one direction and the master-wheel 12 in an opposite direction, slipping by the pawl 16, the actual driving connection between the clutch-disk and the shaft-disk being the projection 62 of the clutch-disk and the cushion-pin 60 of the shaft-disk. When the shaft-disk is revolved, the link-levers 53 and 56 will be drawn toward the center of the shaft-disk, as shown in Fig. 16, and the springs controlling said levers will be contracted. Therefore when it is desired to stop the shaft 10, the extensions 30 of the pulley 27 are carried away from the shaft-disk, and the springs connected with the levers 53 and 56 will expand and force the clutch-disk to assume its normal position. (Shown in Fig. 15.) When the shaft-disk is moving, the tension of the springs on the link-levers 53 and 56 is greatest and the leverage of the levers is the least, whereas when the shaft-disk is at rest the leverage is greatest and the tension of the springs is at a minimum.

In Fig. 18 I have illustrated a modification in the construction of the clutch-disk. Instead of the pawl of the disk being adapted to engage with the smooth surface of the master-wheel the pawl 88 is arranged to engage with teeth 87, formed upon the inner face of the flange 13 of the said master-wheel. This pawl is provided with a weighted end 89, capable of balancing the point. The pawl is provided with a hub 90, as shown in Fig. 31, and with an opening 92 below the hub. In connection with the pawl 88 a contact-plate 93 is provided, which is mounted loosely upon the hub 90 of the pawl, and the said plate is provided with a flange 93ª, adapted for engagement with the flange 13 of the master-wheel at one side of the teeth 87. This contact-plate, which is shown in Fig. 33, is provided with a slot 94 at one end and a slot 95 near the opposite end, and the pivot-pin 96 of the pawl is secured in any suitable or approved manner to the clutch-disk. A spring 97 is attached to the pivot-pin 96 and to a pin 98, attached to the contact-plate 93 near its lower end, as shown in Fig. 19, and pins 99 are passed through the openings 94 and 95 in the contact-plate and into the openings 91 and 92 of the pawl. The spring 97 serves to hold the flange 93ª of the contact-plate against the flange 13 of the master-wheel 12, and as the master-wheel turns in one direction the pawl will be carried, by reason of the contact of the plate 93 with the flange of the master-wheel, out of engagement with the teeth 87 and to an engagement with a stop 101 on the clutch-disk, whereas when the master-wheel turns in an opposite direction the pawl 88, through the same medium, will be brought up to an engagement with the teeth 87.

Sometimes the machine to which the clutch is attached is subjected to shock, which would ordinarily cause the shaft to go faster than the driving-pulley and the member 46ª of the angle-lever 46 to lift from its seat 26. In order to prevent such an accident, recesses 102 (shown in Fig. 24) are produced in the shaft-disk, into which the projections from the driving-pulley may enter after said projections have operated upon the aforesaid lever, and in order that the inner member 46ª of the lever 46 shall not have lateral movement the hub 23 of the shaft-disk 22 is ordinarily continued across the opening or recess 26ª, as shown in Figs. 26 and 27, the continuation of the hub of the shaft-disk being designated as 103.

In order that the pin 48 may have the least possible frictional engagement with the lever 46, the said pin 48 is preferably provided with a roller 48ª at its free end, as shown in Fig. 23. Instead of the openings 102 being provided to receive the projections 31 a latch 104 may be substituted, attached to the shaft-disk 22, as shown in Figs. 21 and 22. This latch 104 is controlled by a spring 105, which carries the latch toward the hub of the shaft-disk 22; but the movement of the latch in direction of the hub of the shaft-disk is regulated by a pin 106. (Shown in the said figures.) After the projections 31 from the driving-pulley have operated upon the lever 46, as shown in Fig. 22, the latch will be forced by its spring 105 to an engagement with one side of the projection 31, engaging with the lever 46, as shown in Fig. 22, insuring the projection 31 traveling with the shaft-disk at equal speed and not permitting the shaft 10 to exceed the speed of the driving-pulley.

In Figs. 28, 29, 30, 35, 36, and 37 I have illustrated a further modification in the construction of the shaft-disk and in the relation of the projections 31 from the driving-pulley to the aforesaid shaft-disk. Instead of the projections 31 engaging with the inner member of the lever attached to the shaft-disk the said projections are adapted to engage with the outer member of the lever. To that end an opening 107 is made in the shaft-disk, through which the pin 48 from the clutch-disk extends, and a latch 108 is provided, having a tension-spring 109 and a spur which engages with a pin 110, as shown particularly in Figs. 28 and 29. A boss 111 is formed on the shaft-disk, and between the said boss and the disk an angle-lever 112 is pivoted corresponding to the angle-lever 46. This angle-lever 112 is composed of a body suitably pivoted and an inner member $112^a$, adapted to travel in the recess $26^a$ at the hub of the shaft-disk, and an outer member $112^b$, against which a segmental projection 31 from the driving-pulley is adapted to engage. The projection 31 or projections, as more than one may be employed, instead of traveling close to the hub of the shaft-disk are made to travel near the periphery of the disk. Consequently the cushion against which the lever 112 is to engage under this construction is at an angle to the axis of the disk, and the said cushion comprises a bracket 116, extended from the disk 22, containing a pin 115, controlled by a spring 114, the said pin being adapted to be engaged by a projection 113 from the aforesaid lever 112. The detail construction of the shaft-disk and the lever 112 is shown in Figs. 30, 35, 36, and 37.

In the form of disk shown in Figs. 28, 29, and 30 recesses or openings 117 are made to receive the extensions from the pulley-pins 30, said recesses being near the periphery of the disk.

Having thus described my invention, I claim as new and desire to secure by Letters Patent—

1. The combination, with a drive-shaft, a master-wheel loosely mounted thereon, a driver for the master-wheel, and a clutch-disk mounted to rotate in the master-wheel and provided with a pawl arranged to engage the master-wheel, the clutch-disk being also provided with a projecting pin, of a disk secured to the shaft, the said disk having a recess receiving the pin from the clutch-disk, a lever upon the shaft-disk, and a driving-pulley loosely mounted upon the shaft and provided with a projection arranged to engage said lever, for the purpose set forth.

2. The combination, with a drive-shaft, a master-wheel loosely mounted thereon, a drive-wheel for the master-wheel, a disk-clutch loosely mounted within the master-wheel and provided with a pawl engaging the said master-wheel, and a driving-pulley provided with movable projections, the said driving-wheel revolving in a contrary direction to the master-wheel, of a disk secured to the drive-shaft, a pin projected from the loosely-mounted disk in the master-wheel, the pin having movement in a recess in the shaft-disk, an angle-lever pivoted upon the shaft-disk, adapted to be engaged by the driving-pulley, and means, substantially as described, for moving the pulley projections to and from the shaft-disk, as specified.

3. The combination, with a driving-shaft, a master-wheel loosely mounted thereon, a driver for the master-wheel, and a clutch-disk mounted to rotate in the master-wheel, the clutch-disk being also provided with a projecting pin, of a disk secured to the shaft, the said disk having a recess receiving the pin from the clutch-disk, a starting-lever fulcrumed upon the said shaft-disk, adapted for engagement with the pin of the clutch-disk, a driving-pulley loosely mounted upon the shaft, projections from the driving-pulley arranged to engage the starting-lever, and tension-controlled link-levers connected with the clutch and shaft disks, and adapted to restore the pin of the clutch-disk to its normal position when the shaft is stopped, substantially as described.

4. In a clutch, a driving-shaft, a clutch-disk mounted to rotate upon the shaft, and provided with a projecting pin, of a disk secured to the shaft, having a surface to receive the said pin, a starting-lever carried by the shaft-disk, adapted to receive the said pin, a driving-pulley loosely mounted upon the shaft, having adjustable projections arranged for engagement with the starting-lever, and tension-controlled link-levers connected with the two disks at opposite sides of the shaft, the tendency of the link-levers being to move the said pin to its normal position.

5. The combination, with a drive-shaft, a master-wheel loosely mounted thereon, a driver for the master-wheel, and a clutch-disk mounted to rotate within the master-wheel and provided with a pawl engaging with said master-wheel, of a disk secured upon the drive-shaft, a pin projected from the disk within the master-wheel and extending within a recessed portion of the shaft-disk, a lever pivoted upon the shaft-disk, a driving-pulley loosely mounted on the shaft, projections from the driving-pulley arranged to extend within the path of the lever on the shaft-disk, and means, as substantially described, for moving the projections of said pulley to or from the shaft-disk, and a locking device for the projections from the pulley, as and for the purpose specified.

6. The combination, with a drive-shaft, a master-wheel loosely mounted thereon, a driver for the master-wheel, and a disk mounted to rotate within the master-wheel and provided with a pawl engaging with said master-wheel, of a disk secured upon the drive-shaft, a pin projected from the disk within the master-wheel, and extending within a recessed portion of the shaft-disk, a lever pivoted upon the shaft-disk, a driving-pulley loosely mounted on the shaft, segmental projections from the driving-pulley, arranged to extend within the path of the lever on the shaft-disk, means substantially as described, for moving the pulley projections, a locking device for the pulley projections, and a trip device carried by the shaft, adapted for engagement with the locking device of the said pulley projections to free the said projections, as and for the purpose set forth.

7. The combination, with a draft-shaft, a master-wheel loosely mounted thereon, a driver for the master-wheel, a clutch-disk mounted to rotate in the master-wheel and provided with a pawl engaging with said master-wheel, and a pin projected from the said clutch-disk, parallel with the said shaft, of a disk secured to the said shaft, having a recess to receive the pin from the clutch-disk, an angle-lever pivoted upon the said shaft-disk, a driving-pulley adapted to rotate in a contrary direction to the master-wheel and loosely mounted on the said shaft, segmental projections from the said pulley, adapted to enter the path of the lever on the shaft-disk, a shifting device for the said segmental projections, a locking device for the said projections, and a trip for the locking device, as and for the purpose set forth.

8. The combination, with a shaft, a master-wheel loosely mounted on the shaft, means for driving the master-wheel, a clutch-disk mounted to turn in the master-wheel, provided with a spring-controlled pawl arranged for engagement with the master-wheel, and a pin extending from the clutch-disk parallel with the shaft, of a disk secured to the said shaft, having a recess to receive the pin of the clutch-disk, an angle-lever pivoted on the shaft-disk, a pulley loosely mounted on the said shaft, and provided with an extended sleeve terminating in a flange, pins having end movement in the hub of the said pulley, the pins terminating in segmental extensions adapted to enter the path of the lever on the shaft-disk, a spring-controlled collar mounted on the sleeve of the said driving-pulley, a keeper-bar carried by the collar, and a latch carried by the flange of the pulley-sleeve, adapted for engagement with the said keeper-bar, as and for the purpose specified.

9. The combination, with a shaft, a master-wheel loosely mounted on the shaft, means for driving the master-wheel, a clutch-disk mounted to turn in the master-wheel, provided with a spring-controlled pawl arranged for engagement with the master-wheel, and a pin extending from the clutch-disk parallel with the shaft, of a disk secured to the said shaft, having a recess to receive the pin of the clutch-disk, an angle-lever pivoted on the shaft-disk, a pulley loosely mounted on the said shaft, and provided with an extended sleeve terminating in a flange, pins having end movement in the hub of the said pulley, the pins terminating in segmental extensions adapted to enter the path of the lever on the shaft-disk, a spring-controlled collar mounted on the sleeve of the said driving-pulley, a keeper-bar carried by the collar, a latch carried by the flange of the pulley-sleeve, adapted for engagement with the said keeper-bar, a trip device carried by the said shaft and adapted for engagement with the latch device, and means, substantially as described, for shifting the trip device and the collar mounted upon the driving-pulley, as and for the purpose specified.

10. The combination, with a shaft, a master-wheel loosely mounted on the shaft, a driver for the master-wheel, a clutch-disk mounted to turn in the master-wheel and provided with a pawl engaging the master-wheel, a disk secured upon the said shaft, a pin projected from the clutch-disk within a recess within the shaft-disk, and an angle-lever pivoted upon the shaft-disk, of a driving-pulley adapted to rotate in a contrary direction to the master-wheel, sliding pins carried by the said pulley, having segmental ends adapted to extend in the path of the lever on the shaft-disk, means, substantially as described, for locking the extensions of the pulley-pins to the shaft-disk, a shifting device for the pulley-pins, and means, substantially as described, for locking the pulley-pins when out of engagement with the shaft-disk, as and for the purpose set forth.

11. The combination, with a shaft, a master-wheel loosely mounted on the shaft, a driver for the master-wheel, a clutch-disk mounted to turn in the master-wheel and provided with a pawl engaging the master-wheel, a disk secured upon the said shaft, a pin projected from the clutch-disk within a recess in the shaft-disk, and an angle-lever pivoted upon the shaft-disk, of a driving-pulley adapted to rotate in a contrary direction to the master-wheel, sliding pins carried by the said pulley, having segmental ends adapted to extend in the path of the lever on the shaft-disk, means, substantially as described, for locking the extensions of the pulley-pins to the shaft-disk, a shifting device for the pulley-pins, means, substantially as shown and described, for locking the pulley-pins when out of engagement with the shaft-disk, a trip device secured to the said shaft, and an extension from the locking device, adapted to be engaged by the said trip device, and a spring normally holding the extensions from the pulley in engagement with the said shaft, for the purpose set forth.

12. The combination, with a shaft, a master-wheel loosely mounted thereon, a driver for the master-wheel, a clutch-disk mounted to rotate within the master-wheel, provided with a pawl engaging therewith, and a disk secured to the said shaft, a pin extending from the clutch-disk into a recess in the shaft-disk, and an angle-lever pivoted to the shaft-disk, arranged for engagement by the said pin, of a pulley loosely mounted on the shaft and provided with a hub extension terminating in a flange, a spring-controlled shaft journaled upon the said flange and provided with a handle extending beyond the said flange, and a latch secured to the said shaft, pins having sliding movement in the hub of the said driving-pulley, the said pins being provided with extensions arranged to enter the path of the lever of the shaft-disk, a spring-controlled collar loosely mounted on the hub extension of the pulley, a keeper-bar attached to the said collar and extending through the flange connected with the driving-pulley, adapted to be engaged by the latch on the flange-shaft, and means, substantially as described, for shifting the said collar, for the purpose set forth.

13. The combination, with a shaft, a master-wheel loosely mounted thereon, a driver for the master-wheel, a clutch-disk mounted to rotate within the master-wheel, provided with a pawl engaging therewith, and a disk secured to the said shaft, a pin extending from the said clutch-disk into a recess in the shaft-disk, and an angle-lever pivoted to the shaft-disk, arranged for engagement by the said pin, of a pulley loosely mounted on the shaft and provided with a hub extension terminating in a flange, a spring-controlled shaft journaled upon the said flange and provided with a handle extending beyond the flange, and a latch secured to the said shaft, pins having sliding movement in the hub of the said driving-pulley, the said pins being provided with extensions arranged to enter the path of the lever of the shaft-disk, a spring-controlled collar loosely mounted on the hub extension of the pulley, a keeper-bar attached to the said collar and extending through the flange connected with the driving-pulley, and adapted to be engaged by the latch on the flange-shaft, and means, substantially as described, for shifting said collar, a trip-arm attached to said shaft and arranged for engagement with the extension from the latch-shaft, and means, substantially as shown and described, for holding the extensions from the driving-pulley in the shaft-disk, for the purpose set forth.

THEODORE J. KOVEN.

Witnesses:
J. FRED. ACKER,
EVERARD BOLTON MARSHALL.